Sept. 13, 1966  W. N. HADLEY  3,271,835
FABRIC TENSIONING DEVICE FOR SHEARING MECHANISMS
Filed Feb. 27, 1964
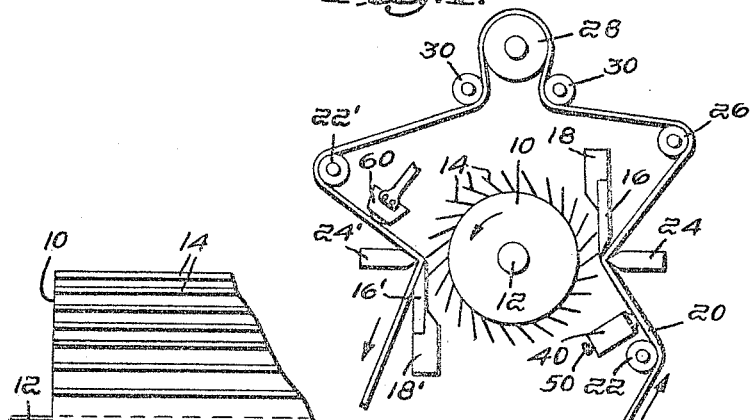
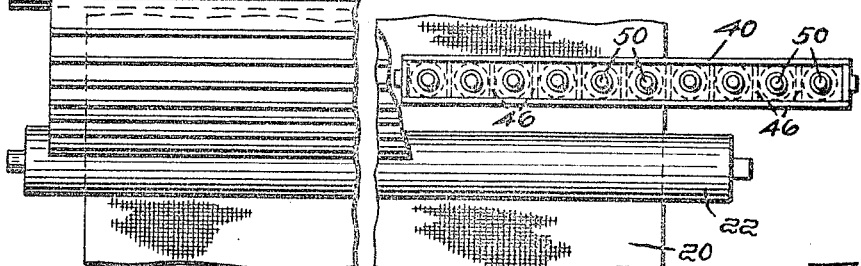
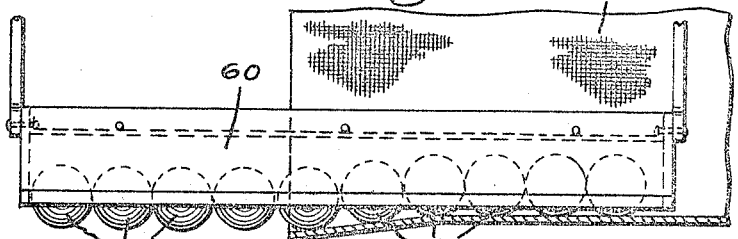
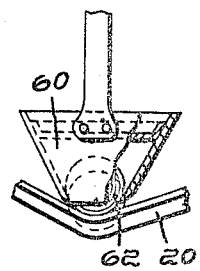
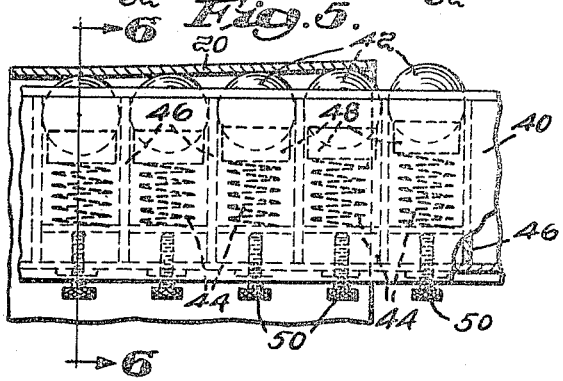
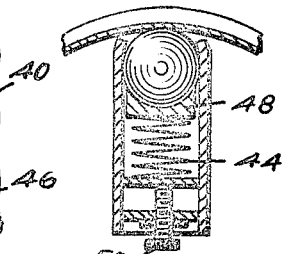
Inventor:
Wilfred N. Hadley,
by Lawrie S. Witter
Attorney

United States Patent Office 3,271,835
Patented Sept. 13, 1966

3,271,835
FABRIC TENSIONING DEVICE FOR SHEARING MECHANISMS
Wilfred N. Hadley, Springfield, Vt., assignor to Hadley Company, Inc., Springfield, Vt., a corporation of Vermont
Filed Feb. 27, 1964, Ser. No. 347,758
4 Claims. (Cl. 26—15)

This invention relates to fabric tensioning mechanisms and particularly to novel and improved means for removing and eliminating selvage slack in woven fabrics being sheared. Such machines are employed to shear loose threads from one face as the fabric passes a shearing line extending thereacross. Accurate shearing of the threads at said face without damage to the fabric requires that the strip be maintained uniformly taut especially at the selvage portions which may become slack and assume a puckering condition causing cutting damage to the fabric. The fabric strip is supported in full width and fed under predetermined tension to and through the shearing mechanism over cylindrical rolls disposed forwardly and rearwardly of such mechanism. My invention herein contemplates the employment of juxtaposed elements disposed in alignment forwardly of the shearing mechanism and extending transversely of and in contact with one face of the strip, especially at one or both marginal portions thereof, together with means for supporting the elements for limited independent movement toward and in fabric tensioning contact with said face, and thereby taking up any slack and maintaining the fabric in constant tension. The production of novel fabric tensioning mechanism of this nature and adapted thus to eliminate selvage slack and prevent fabric cutting damage comprises a primary object of the invention.

These and other features of the invention will be more clearly understood from the following description of a preferred embodiment thereof illustrated in the accompanying drawing in which:

FIG. 1 is an end view of a machine embodying the invention,

FIG. 2 is a front elevation of the machine, broken away and showing in plan view the tensioning mechanism employed at the right side of FIG. 1, FIG. 3 is an enlarged fragmentary view showing in elevation the tensioning mechanism employed at the left side of FIG. 1, FIG. 4 is an end view thereof, FIG. 5 is an enlarged fragmentary view showing in elevation the tensioning mechanism shown in FIG. 2, and FIG. 6 is a view taken on line 6—6 of FIG. 5.

In the drawing, 10 indicates a cylindrical revolver carried on a shaft 12 rotatably supported at its ends in the frame of the machine. Spaced shearing blades 14 extend longitudinally of and are mounted in the revolver at its periphery, and a ledger knife 16 carried on a support 18 has its cutting edge disposed in cooperating shearing relation with the blades 14.

The machine is provided with means for supporting in full width and conducting longitudinally at predetermined tension through the machine to and past the ledger knife and blades a strip of fabric 20 to be sheared. As illustrated in FIG. 1, the fabric is fed upwardly over a guide roll 22 to and over an anvil 24. The ledger knife 16 has its shearing edge disposed along the anvil in cooperating shearing position with the blades 14. From thence the fabric pasess over a guiding roll 26 to and about a power driven drum 28, guide rolls 30 supporting the fabric as it enters and leaves the drum. In its downward path the fabric passes through a like shearing mechanism comprising a guide roll 22', an anvil 24' and a ledger knife 16'.

The fabric feeding means, including the drum 28, continuously feeds the fabric in the direction of the arrows while maintaining it under predetermined tension. The guide roll 22 is in adjacent spaced relation forwardly of the ledger knife 16 and thus quite directly supports and controls the fabric as it enters and passes through the shearing position, the roll 22' being likewise disposed and functioning in like manner.

While the rolls above described normally provide uniform and ample tensioning support for the interior body portion of the fabric strip, the selvage portions may become slack and assume a puckering condition causing cutting damage to the fabric. My invention herein contemplates relatively simple tensioning mechanism disposed to contact these selvage portions at either or both margins of the fabric, thereby automatically taking up all slackness and eliminating the puckering and resulting damage that could otherwise occur.

The tensioning mechanism 40 is placed forwardly of the anvil 24 as illustrated in FIG. 1, and comprises a trough supporting therein and therealong a series of fabric contacting elements, preferably spherical balls 42. The trough is provided with a longitudinal slot or open side (FIG. 6) through which the balls are free to project but of a width preventing their escape. The trough is supported in any convenient manner transversely of the fabric and extends across one marginal portion with the balls disposed to contact the adjacent face of the fabric. Since the trough and balls are disposed beneath the fabric it is necessary to force the balls toward and into contact with the fabric. As shown in FIGS. 2, 5 and 6, I have illustrated for this purpose individual spring coils 44, each ball and spring being housed within a separate compartment provided by separator plates 46 between adjacent balls and springs. Each compartment is also provided with a shoe 48 for engaging the ball and a threaded stud 50 for adjusting the spring force against the ball. Thus the balls serve independently to contact the fabric and roll freely in any direction thereon. As illustrated in FIG. 5, the balls function automatically to hold the selvage taut as it passes to and over the anvil 24.

The tensioning mechanism 60 illustrated at the left side of FIG. 1 is substantially the same as above described except that no springs are required since the trough 60 is located above the fabric. As shown in FIGS. 3 and 4, the balls 62 are disposed to project downwardly and outwardly of the slot in the trough but cannot escape therefrom. The balls are made of steel or such heavy material that they function by gravity to perform the selvage tensioning function as illustrated in FIG. 3.

Having thus disclosed my invention, what I claim as new and desire to secure by Letters Patent is:

1. In a cloth shearing machine, a rotatably mounted cylinder having a plurality of spaced shearing blades extending longitudinally thereof at its periphery, a ledger knife disposed longitudinally of the cylinder and having one longitudinal margin in shearing relation with the blades, means for supporting in full width and conducting longitudinally at predetermined tension through the machine to and past the ledger knife and blades a strip of fabric to be sheared, a series of juxtaposed elements disposed in alignment forwardly of the ledger knife and extending transversely of the strip to a limited extent less than the full width thereof and in contact with one face of the strip at one marginal portion thereof, and common housing means supporting the elements for limited independent movement toward and in fabric tensioning contact with said face whereby said elements remove slack from said marginal portion and hold the strip taut as it passes to the ledger knife and shearing blades.

2. The shearing machine defined in claim 1 further comprising resilient means engaging and normally forcing each of said elements forwardly toward and into contact with the fabric.

3. The shearing machine defined in claim 1 in which said elements are spheres.

4. The shearing machine defined in claim 1 in which said elements are spheres and the last named means comprises a trough supporting the spheres in alignment therein and having a slot of a width permitting the spheres to project outwardly a limited distance through the slot.

References Cited by the Examiner

UNITED STATES PATENTS

| | | | |
|---|---|---|---|
| 106,134 | 8/1870 | Dean | 242—75.2 |
| 244,817 | 7/1881 | McColl | 26—15 |
| 926,508 | 6/1909 | Paterson | 242—75.2 |
| 1,681,917 | 8/1928 | Horstmann | 26—15 |
| 2,128,377 | 8/1938 | Richardson | 26—15 X |
| 3,106,365 | 10/1963 | Karr. | |
| 3,130,472 | 4/1964 | Bickford | 26—15 |

FOREIGN PATENTS

| | | |
|---|---|---|
| 211,195 | 6/1909 | Germany. |
| 444,514 | 5/1927 | Germany. |
| 3,951 | 1815 | Great Britain. |
| 4,487 | 1820 | Great Britain. |
| 8,751 | 1801 | Great Britain. |

ROBERT R. MACKEY, *Primary Examiner.*